Oct. 14, 1969   S. M. BROADWIN   3,472,152
APPLIANCE FOR BREWING A BEVERAGE WITH DISTILLED WATER
Filed May 7, 1968
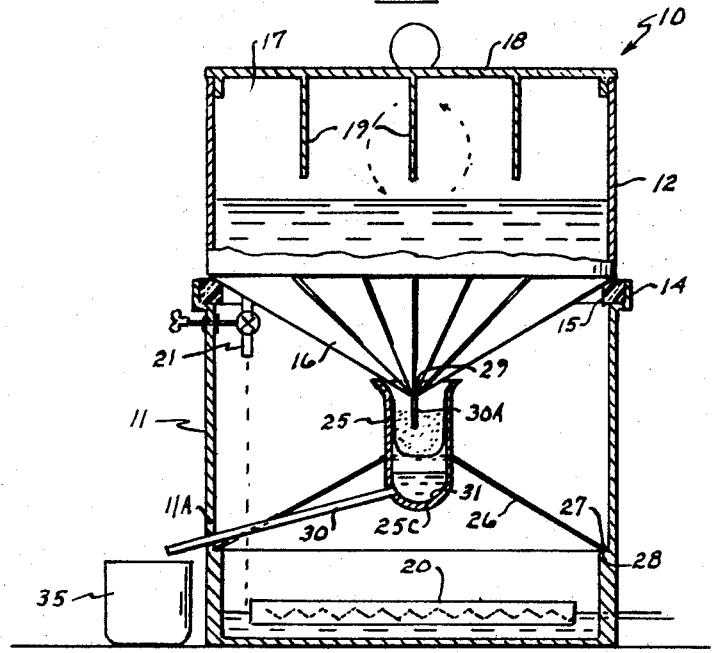
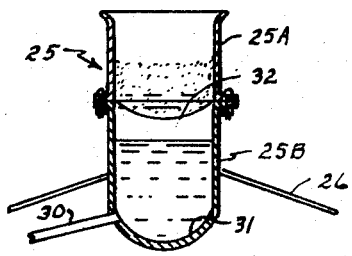
INVENTOR
SAMUEL M. BROADWIN
BY Howard J. Jeandron
AGENT

United States Patent Office 3,472,152
Patented Oct. 14, 1969

3,472,152
APPLIANCE FOR BREWING A BEVERAGE
WITH DISTILLED WATER
Samuel M. Broadwin, 60 E. 8th St.,
New York, N.Y. 10002
Filed May 7, 1968, Ser. No. 727,195
Int. Cl. A47j 31/12
U.S. Cl. 99—293    4 Claims

ABSTRACT OF THE DISCLOSURE

A distilling apparatus for water having a brewing chamber to receive the distilled water for brewing and storing and said brewing chamber having an outlet to draw the brewed liquid from the apparatus.

This invention relates to a coffee maker and more specifically to an apparatus used in distilling water in which the heated distilled water is passed through the ground coffee beans and through a filter to produce a chemically pure coffee.

With the present day clorination of the various domestic water supplies and further fluoridation of the water we have water that is not chemically pure and not refined for percolation through ground coffee beans to make pure coffee brew. Thus it is an object of this invention to provide a composite water retaining cylinder to supply a minimum water flow to a boiler wherein the water is boiled and steam generated and in which the rising steam is contained to condense upon the cooler surface of a cone shaped bottom of the water retaining cylinder and further in which the condensing distilled water drains into a cup in which the ground coffee beans are retained upon a filter and in which the flow of hot distilled water percolates through the ground coffee beans and is drained off as a chemically pure coffee.

A still further object of this invention is to provide a water still to remove the chemicals found in most domestic water supplies and with a predetermined quantity of raw water and the necessary heat supplied a chemically pure distilled water may be produced.

A still further object of this invention is to provide a water still to remove the chemicals found in most domestic water supplies and with any of the brewed beverages that must be melted or dissolved by hot water the ultimate brew will be chemically pure.

Other objects of this invention shall be apparent by reference to the accompanying detailed description and the drawing in which FIG. 1 is a cross sectional view of the water-still brewing appliance, and FIG. 2 is an enlarged cross-sectional view of the percolating cup.

Referring to the drawings and particularly FIG. 1, there is illustrated an appliance 10 which includes a composite vessel made up of a lower pot 11 and an upper vessel formed as a boiler or tank 12. The upper boiler or tank 12 is of a size to fit upon the rim 14 of the lower pot 11. The rim 14 may be provided with a neoprene or similar heat resistant flexible gasket 15 to provide a seal for the lower pot 11. The upper boiler or tank 12 is formed with a conically shaped bottom 16 and the surface of the bottom 16 is fluted to provide a greater area. This surface of bottom 16 is necessarily of a good heat conducting material such as copper. The bottom surface 16 is also provided with a drip valve 21 and also a drip pin 30A at the apex of the conical bottom.

The upper vessel 12, has an open top 17 and this is covered with a lid 18. The lid 18 has a plurality of downwardly projecting fins 19. The lower pot 11 may be similar to a cooking pot to thus be inserted upon a stove or heating element, or in the embodiment shown the heating elements 20 may be electric elements mounted within the pot 11 and externally connected to a source of power (not shown). The drip valve 21 may be set to provide a desired feed of water based upon the heat output of the elements 20 or the valve 21 may have an adjusting extension thru the wall of the lower pot 11 to permit regulating the flow or drip of the water from vessel 12 to pot 11.

A central brewing cup 25 supported on a spider shaped frame 26 is positioned in pot 11 so that the feet 27 of the frame rest upon a shoulder 28 and support the cup 25 in a central position directly under the inverted apex 29 of the cone shaped bottom 16. Cup 25 also has a drain pipe 30 that extends from the internal area 31 of the cup to and through the wall 11A of pot 11. The external surface 25C of the cup 25 is provided as a heat reflector. Cup 25 may be constructed as a two piece cup as shown in FIG. 2. In this embodiment a filter 32 is clamped between the two portions 25A and 25B when they are assembled. Thus in this embodiment a ground coffee, tea or the product to be melted or dissolved may be inserted in the upper portion 25A of the cup.

In operation with water in tank 12 and heating elements 20 turned on, water will drip from valve 21 and surround elements 20 to be heated. When the water reaches a boiling temperature, steam will rise and as the steam contacts the cooler bottom 16, it will condense. Due to the conical shape of the bottom 16, the condensing droplets will run down the conical surface to the apex 29. The droplets will build up and drain into the cup 25. The chemically pure distilled water will drain through pipe 30 to be collected. In the further embodiment illustrated in FIG. 2, the hot distilled water dripping or running into cup 25 will fall upon the brewing charge such as ground coffee and the percolating fluid will pass through the filter 32 and pass into the lower portion 25B of the cup and out the drain pipe 30 to be collected in a cup 35.

It is to be noted that the bottom surface 16 of the tank 12 is fluted to thus increase the condensing area. It is also to be noted that with a controlled minimum flow of water into vessel 11, the water is quickly transformed into steam. Also to be noted is the fact that the water supply or tank 12 rises in temperature so that the water dripping into vessel 11 is more quickly transferred into steam. As long as the tank 12 temperature is below boiling, the steam will continue to condense. With the top 18 provided with projecting fins 19 and the water level maintained below the fins, there is a tendency to break up the circulation of the heat rising that contacts the surface of the fins and is conducted away.

Various changes may be made in the size, style or shape of composite vessel and the manner of heating said vessel may vary without departing from the spirit of this invention. It is also to be understood that the brewing cup may be enlarged to retain the brewed liquid hot for dispensing at will and this invention shall be limited only by the appended claims.

What is claimed is:
1. A distilling device for purifying water that is to be percolated through a brewing charge which includes a two piece vessel, an upper water retaining tank and a lower boiling pot, said lower boiling pot having an open top with a sealing gasket on the rim of said pot, said upper water retaining tank having an open top with a cover and a conically shaped closed bottom with the apex of the conical bottom pointing downward, said conical bottom having a water feed valve to drain water from the upper tank to the lower pot, said apex of the conical bottom of said upper tank having an extended drip pin, a brewing cup supported under the apex of the conical bottom with an outlet tube from said cup to the exterior of said pot and a strainer at the outlet of said cup to re- tain the brewing charge during the percolation of the distilled water through said cup.

2. In a device according to claim 1 in which the conical bottom of said upper tank is fluted to increase the condensing area exposed to the rising steam from said lower pot when the water is boiled.

3. In a device according to claim 1 in which said brewing cup is formed in two pieces with a filter retained between the two pieces when they are affixed together.

4. In a device according to claim 1 in which said cover for said tank is provided with a plurality of downwardly extending fins to divert and increase the cooling area of the under surface of said cover.

References Cited

UNITED STATES PATENTS

| | | | |
|---|---|---|---|
| 222,402 | 12/1879 | Hawley | 99—293 X |
| 2,350,335 | 6/1944 | Baker | 99—293 X |
| 2,983,217 | 5/1961 | Gill | 99—294 |

ROBERT W. JENKINS, Primary Examiner